(12) United States Patent
Rodiac (10) Patent No.: US 8,898,918 B2
(45) Date of Patent: Dec. 2, 2014

(54) INSTRUMENT FOR MEASURING LENGTH, AND METHOD AND DEVICE FOR CONTROLLING THE SIZE OF A FUEL ROD

(75) Inventor: Frédéric Rodiac, Mimet (FR)

(73) Assignee: Comissariat a l'Energie Atomique et Aux Energies Alternatives, Paris (FR)

( * ) Notice: Subject to any disclaimer, the term of this patent is extended or adjusted under 35 U.S.C. 154(b) by 0 days.

(21) Appl. No.: 14/235,425

(22) PCT Filed: Aug. 1, 2012

(86) PCT No.: PCT/FR2012/000322
§ 371 (c)(1),
(2), (4) Date: Apr. 17, 2014

(87) PCT Pub. No.: WO2013/021104
PCT Pub. Date: Feb. 14, 2013

(65) Prior Publication Data
US 2014/0247041 A1    Sep. 4, 2014

(30) Foreign Application Priority Data
Aug. 8, 2011 (FR) ..................... 11 02483

(51) Int. Cl.
*G01B 5/00* (2006.01)
*G01B 7/02* (2006.01)

(52) U.S. Cl.
CPC . *G01B 7/02* (2013.01); *G01B 7/023* (2013.01)
USPC ......................................................... 33/502

(58) Field of Classification Search
USPC .................... 33/502, 503, 556, 559
See application file for complete search history.

(56) References Cited

U.S. PATENT DOCUMENTS

| 4,306,208 A | 12/1981 | Coors |
| 5,687,487 A | 11/1997 | Johnson |
| 6,546,643 B2 * | 4/2003 | Lotze et al. ..................... 33/559 |
| 6,813,966 B2 * | 11/2004 | Dukart ....................... 73/862.69 |
| 8,439,404 B2 * | 5/2013 | Anton et al. ..................... 285/93 |
| 2013/0270814 A1 * | 10/2013 | Anton et al. .................... 285/93 |
| 2014/0167745 A1 * | 6/2014 | Held et al. ............... 324/207.12 |
| 2014/0247041 A1 * | 9/2014 | Rodiac ..................... 324/207.18 |

FOREIGN PATENT DOCUMENTS

GB   2 218 227 A   11/1989

OTHER PUBLICATIONS

International Preliminary Report on Patentability for International Application PCT/FR2012/000322.
English translation of the International Preliminary Report on Patentability for International Application PCT/FR2012/000322.

* cited by examiner

*Primary Examiner* — Yaritza Guadalupe-McCall
(74) *Attorney, Agent, or Firm* — Ladas & Parry LLP (57) ABSTRACT

The invention relates, in particular, to an instrument for measuring length, comprising an inductive sensor comprising an elongate body and a tip that is movable along a longitudinal axis. The body contains windings and defines a first cavity receiving a magnetic core. The instrument further comprises a casing which extends the body along the longitudinal axis, and which defines, together with the body, a second sealed cavity containing the tip. The capacity of the casing to resiliently deform along the longitudinal axis is greater than the capacity of said casing to resiliently deform along axes that are orthogonal to said longitudinal axis.

21 Claims, 5 Drawing Sheets

INSTRUMENT FOR MEASURING LENGTH, AND METHOD AND DEVICE FOR CONTROLLING THE SIZE OF A FUEL ROD

RELATED APPLICATION INFORMATION

This application is a 371 of International Application PCT/FR2012/000322 filed 1 Aug. 2012 entitled "Instrument For Measuring Length, And Method And Device For Controlling. The Size Of A Fuel Rod", which was published on 14 Feb. 2013, with International Publication Number WO 2013/021104 A1 and which claims priority from French Patent Application 1102483, filed 8 Aug. 11, the content of which is incorporated herein by reference.

TECHNICAL FIELD

The present invention relates to a length measurement instrument and to a device for inspecting a transverse dimension of a fuel rod, the device including the instrument.

The invention also relates to a method of inspecting the dimensions of a fuel rod with the help of the instrument.

The invention is applicable in particular to inspecting radial deformations of the outer wall of the sheath of a nuclear fuel rod.

STATE OF THE ART

Because of the mechanical and thermal stresses exerted by nuclear fuel pellets against the wall (or sheath) of a tubular container (or rod) containing the pellets, the wall is liable to become deformed, e.g., by swelling or ovalizing, and it is sometimes necessary to measure or inspect the magnitude of the deformation of such a wall.

For this purpose, provision is generally made for extracting the rod for inspection from the pool of the reactor in which the rod is located, and for transporting the rod to a shielded cell fitted with measurement instruments adapted to measuring such deformations.

In the shielded cell, the deformations of the sheath of the rod may be measured by moving the feeler tip of an inductive sensor of the linear voltage differential transformer (LVDT) type along the longitudinal axis of the rod.

Such an inductive sensor comprises an elongate body defining a tubular cavity in which a ferromagnetic core is mounted to slide along the longitudinal axis of the cavity, and a feeler tip secured to the core, which tip extends outside the cavity in line with the body and is intended to be put into contact with an article to be measured.

The body of the inductive sensor further includes a primary winding for powering by a signal generator, and secondary windings for delivering signals when the primary winding is powered, these signals varying depending on the relative position of the core and of the windings, such that it is possible to determine the position of the core by analyzing the signals, and consequently to determine the position of the feeler tip relative to the body of the sensor.

Since the rod is irradiated, the operations of transferring and transporting the rod are complex and expensive.

In order to measure the thickness of oxide on the surface of a fuel rod, patent FR 2 817 338 describes a measurement device having an eddy current feeler immersed in a pool. Nevertheless, that type of feeler is not suitable for measuring the diameter of the outside face of a fuel rod.

That technology is suitable mainly for inspecting a zone close to a surface, in particular for measuring the thickness of a layer of insulation on a conductive material, and for detecting cracks or non-uniformities in a part.

In order to be able to inspect dimensions (thickness) using eddy currents, the part for inspection must be uniform, which does not apply to a fuel rod that comprises a sheath made of a stainless alloy or of an alloy of the Zircaloy type, and that contains pellets that may present cracks and between which there may be "empty" volumes.

Furthermore, LVDT type sensors that present sufficient accuracy to be capable of measuring deformation of small amplitude are not suitable for use under water, and LVDT sensors designed for use under water do not present sufficient accuracy.

SUMMARY OF THE INVENTION

An object of the invention is to propose a length measurement instrument, a device for inspecting the dimensions of a fuel rod and including the instrument, and a method of inspecting the dimensions of a fuel rod with the help of the instrument, which instrument, device, and method are improved and/or remedy, at least in part, the shortcomings or drawbacks of prior art instruments, devices, and methods.

An object of the invention is to provide a length measurement instrument presenting accuracy of the order of one or a few micrometers, and that is suitable for use under water and in the presence of radiation to measure the radial deformation of the outside face of the sheath of a fuel rod, e.g. swelling or ovalizing deformation, and also to provide a profile-measurement method and device making use of the measurement instrument (or respectively including it).

In one aspect, the invention provides a length measurement instrument comprising an inductive sensor having an elongate body and a feeler tip movable relative to the body along a longitudinal axis; the body of the inductive sensor contains windings and defines a first cavity receiving a (ferro)magnetic core connected to the feeler tip; the instrument further comprises a hollow body forming a casing that extends the body of the inductive sensor along the longitudinal axis and that co-operates with the body of the sensor to define a second cavity that is leaktight and that contains the feeler tip; and the capacity of the casing for elastic deformation along the longitudinal axis (of the body and of the sensor) is larger compared with, i.e. greater than, the capacity of the casing for elastic deformation along axes orthogonal to the longitudinal axis.

Thus, when the instrument is immersed, the casing can deform axially in order to transmit abutment forces acting on a portion of the casing to the feeler tip, while allowing the feeler tip to move inside the second cavity.

For this purpose, the casing may comprise an airtight and watertight deformable part surrounding the feeler tip and presenting mechanical stiffness that is low along an axis that coincides substantially with the longitudinal axis of the body; the deformable part may present the shape of a body of revolution about the longitudinal axis; this deformable part may present axial stiffness, i.e. stiffness along its axis of revolution, that is low, together with radial stiffness that is much greater than the axial stiffness.

The deformable part may present a corrugated tubular shape, and may be constituted essentially by a bellows.

Under such circumstances in particular, the ratio of the radial stiffness of the deformable part (and/or of the casing) over its axial stiffness may be greater than 10, and in particular greater than 100 or 1000.

In embodiments, the casing or bellows may present axial stiffness that lies in the range about 1 newton per millimeter (N/mm) to about 10 N/mm.

In a first embodiment, the capacity for elastic deformation of the casing along the longitudinal axis of the sensor is sufficient for the feeler tip to be sensitive to the movement of a portion of the casing, referred to as its "abutment" portion, that lies in line with the feeler tip, the movement being under the effect of an abutment force exerted against the abutment portion of the casing by an article that is to be measured.

In other words, and according to another aspect of the invention, a length measurement instrument is provided that comprises an inductive sensor, generally of the LVDT type, with its feeler tip extending inside a leaktight casing secured to the body of the sensor; the casing comprises a bellows having a longitudinal axis that corresponds to the axis of greatest elastic deformation of the bellows and that coincides substantially with the sliding axis of the feeler tip; the bellows is fastened (in leaktight manner) to the body of the sensor at a first one of its longitudinal ends; the casing also has a pad closing the bellows at its second longitudinal end, and the (axial) longitudinal stiffness of the bellows is selected to be low enough to enable the pad to move along the longitudinal axis of the bellows over at least a substantial fraction of the stroke of the feeler tip of the inductive sensor and in contact therewith, such that the movement of the pad placed in contact with an article for measuring and moving relative to the body of the sensor is transmitted to the feeler tip, and to the magnetic core of the inductive sensor, with the outside face of the pad then acting as the feeler tip of the instrument.

By way of example, the stroke of the feeler tip of the inductive sensor, i.e. the maximum amplitude of its movement in translation along the longitudinal axis of the body, may be situated in a range from one to a few millimeters up to one or several tens of millimeters.

In an embodiment that is particularly adapted to measuring a transverse dimension of a fuel rod immersed in a pool, the portion of the casing that extends in line with the feeler tip of the inductive sensor, and in particular said pad, is spaced apart from the feeler tip of the inductive sensor while the instrument is at atmospheric pressure, whereas this portion of the casing comes into contact with the feeler tip of the inductive sensor when the instrument is placed in a medium in which there exists a pressure greater than atmospheric pressure.

In particular, the cross-section of the casing, where applicable the diameter of the bellows, and also the axial stiffness of the casing, or the bellows as the case may be, may be selected in such a manner as to compensate for the force due to the difference between the pressure of the air inside the cavity receiving the feeler tip and the immersion pressure of the instrument so as to ensure contact between the feeler tip of the sensor and the abutment portion of the casing, or pad, forming the feeler tip of the instrument.

At least a portion of the deformable casing, in particular the bellows or the pad, may be made of metal.

According to another aspect, the invention provides a device for inspecting the shape of the outside face of a nuclear fuel rod, which device includes at least one length measurement instrument as described in the present application.

In embodiments of the device for inspecting the shape of a fuel rod:
  the device may comprise a stationary structure and an instrument support that is movable in translation relative to the stationary structure along at least one axis, in particular along a first axis and along at least one second axis perpendicular to the first axis; in particular, the instrument support may comprise an X,Y cross motion table carrying backstops and allowing the backstops to move relative to a rod for inspection, at least along the second axis;
  the instrument support may receive (at least) two length measurement instruments as described in the present application; namely: i) a first instrument in which the preferred deformation axis, i.e. the axis of least stiffness, of the deformable casing is substantially orthogonal to the axis (to said first axis) in which the instrument support moves in translation; and ii) a second instrument, substantially identical to the first instrument, in which the axis of least stiffness of the deformable casing is substantially orthogonal to the axis in which the instrument support moves in translation and also, where applicable, to the preferred deformation axis of the first instrument; and
  the instrument support may include two stationary parts or portions acting as backstops for a rod that is to be inspected, two movable parts serving as measurement feelers and coming directly or indirectly into abutment thereagainst, said abutment portions of the casing (i.e. said pads) and return means serving to keep the outside surface of the rod for inspection in contact with the measurement feelers and with the backstops.

In another aspect, the invention provides a method of inspecting the shape of the outside face of a nuclear fuel rod, in which length measurement instruments as described in the present application are immersed in a pool containing the rod, and the instruments are used for measuring a transverse dimension of the rod.

The invention makes it possible to perform accurate meteorological inspection of irradiated rods in situ (i.e. under water), without requiring the rods to be transported away from the site where they are in use.

Other aspects, characteristics, and advantages of the invention appear in the following description, which refers to the accompanying figures and shows preferred embodiments of the invention without any limiting character.

DETAILED DESCRIPTION OF THE INVENTION

Except where indicated explicitly or implicitly to the contrary, elements or members that are structurally or functionally identical or similar are designated by identical references in the various figures.

Except where indicated to the contrary, in the present application, the terms "sensor" and "feeler" are synonymous and therefore interchangeable.

Except where indicated explicitly or implicitly to the contrary, in the present application, the terms "axial", "radial", "axially", and "radially" are used relative to an axis such as the longitudinal axis of a rod, the longitudinal axis of the instrument, the axis along which the feeler tip of the inductive sensor moves in translation, or the longitudinal axis of the body of the inductive sensor, where the latter three axes may coincide.

Figure 1:
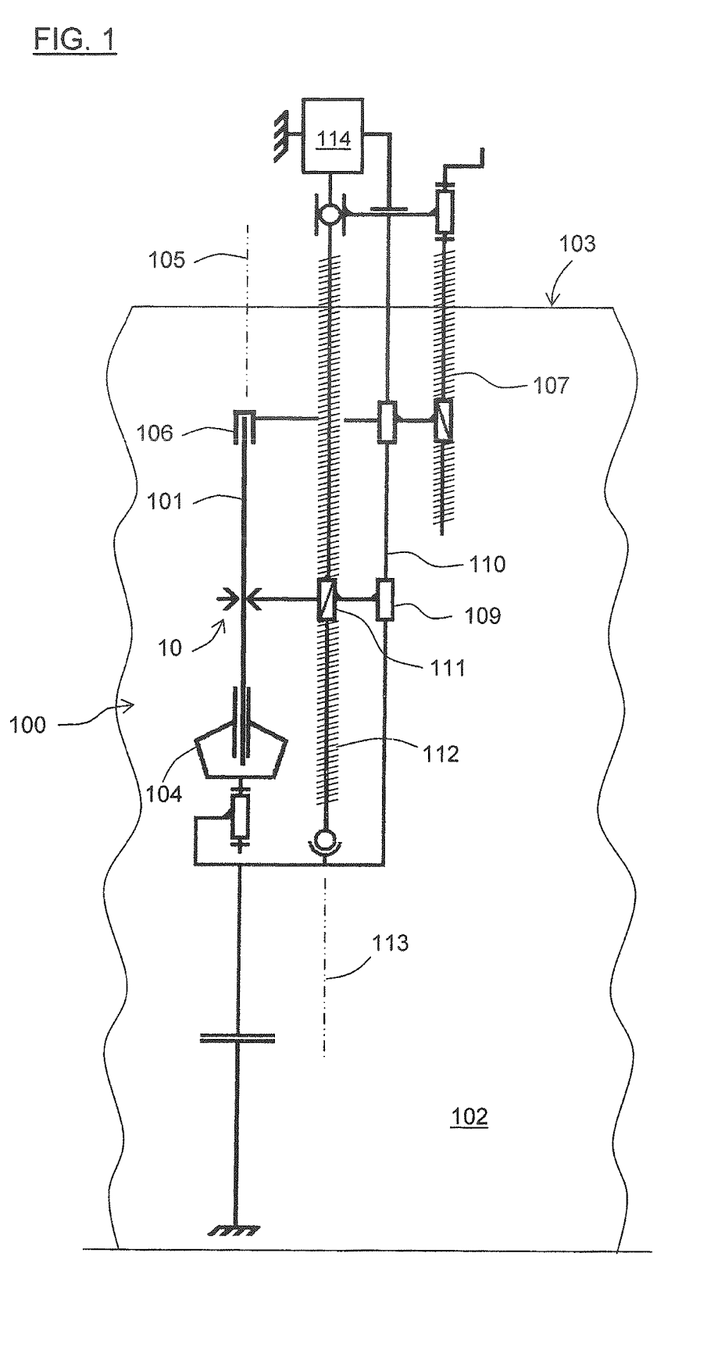
FIG. 1 is a diagrammatic view of a device used for inspecting the diameter of a nuclear fuel rod immersed in a pool and at different positions along the rod, in order to establish a profile of variations in this diameter along the longitudinal axis of the rod.

With reference to FIG. 1 in particular, the device, or bench, 100 for dimensional inspection serves to measure a radial dimension, or diameter, of a nuclear fuel rod 101 extending vertically in a pool 102 full of water.

To this end, the major portion of the profile-measuring bench 100 (its bottom portion) is immersed under the level 103 of the water; the (emerging) top portion of the bench is accessible to operators who can position a rod for inspection on the bench, under water, by using a remotely controlled clamp (not shown).

By way of example the rod 101 may present a length, or height, of the order of one meter, and its top end may be immersed under about one meter of water.

The bottom portion of the rod 101 is held in place by a mounting device 104 of angular position that is adjustable (about the longitudinal axis 105 of the rod).

The top portion of the rod 101 is held in position by a tailstock 106 of height that can be adjusted manually by actuating an adjustment screw 107.

The tailstock 106 may include a calibration stud consisting essentially in a cylindrical part of circular section that extends in line with the top end of the rod for inspection and that is of a diameter that corresponds to the nominal value of the diameter of the diameter of the rod, so as to enable measurement instruments to be calibrated by measuring the diameter(s) of the calibration stud.

The angular positioning of the rod may be inspected by means of a camera and an index mark (not shown).

Figure 3:
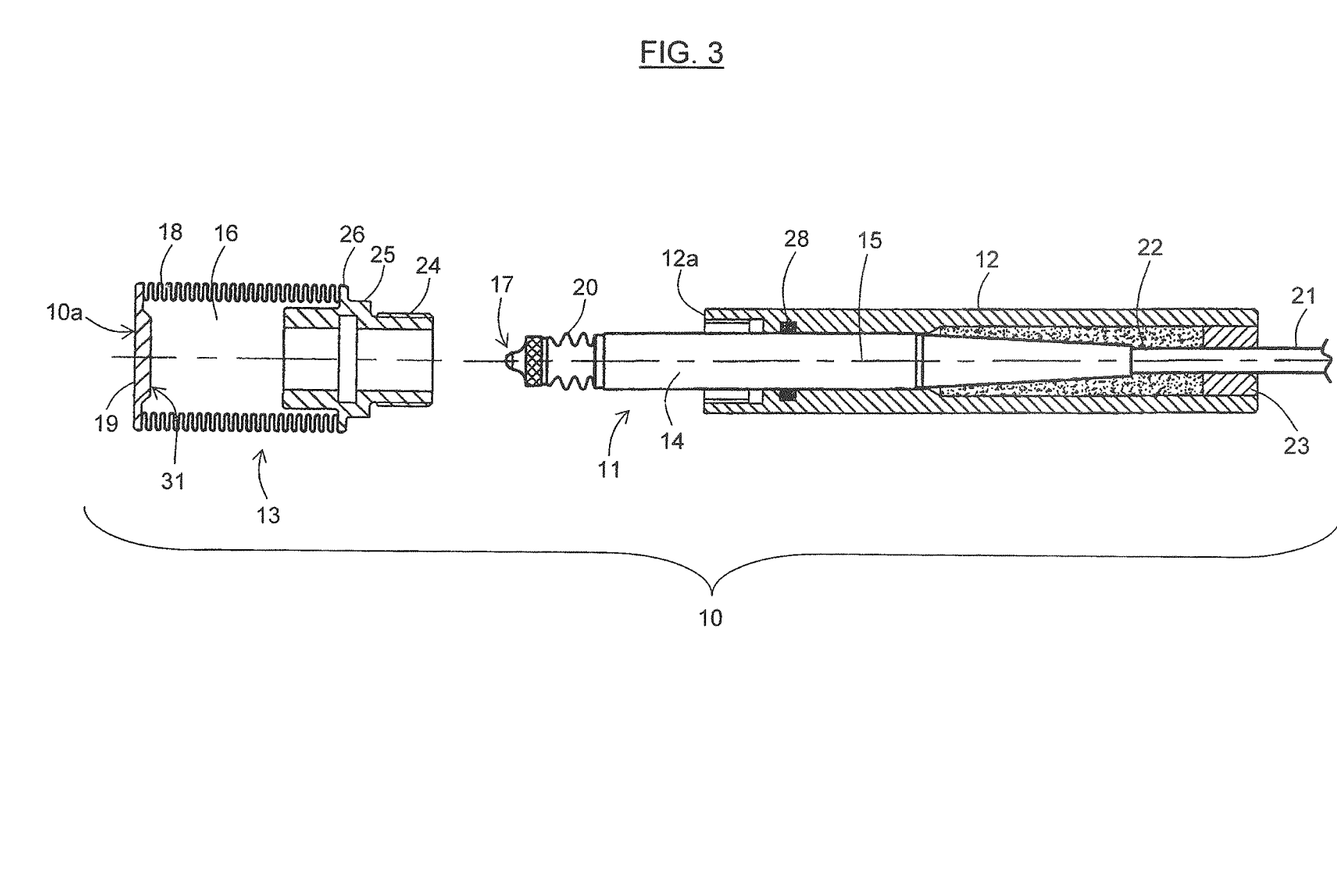
FIG. 3 is a diagrammatic longitudinal section view of a measurement instrument suitable for being fitted to the device of FIGS. 1 and 2, this figure showing the two portions of the body of the instrument separate from each other.
Figure 4:
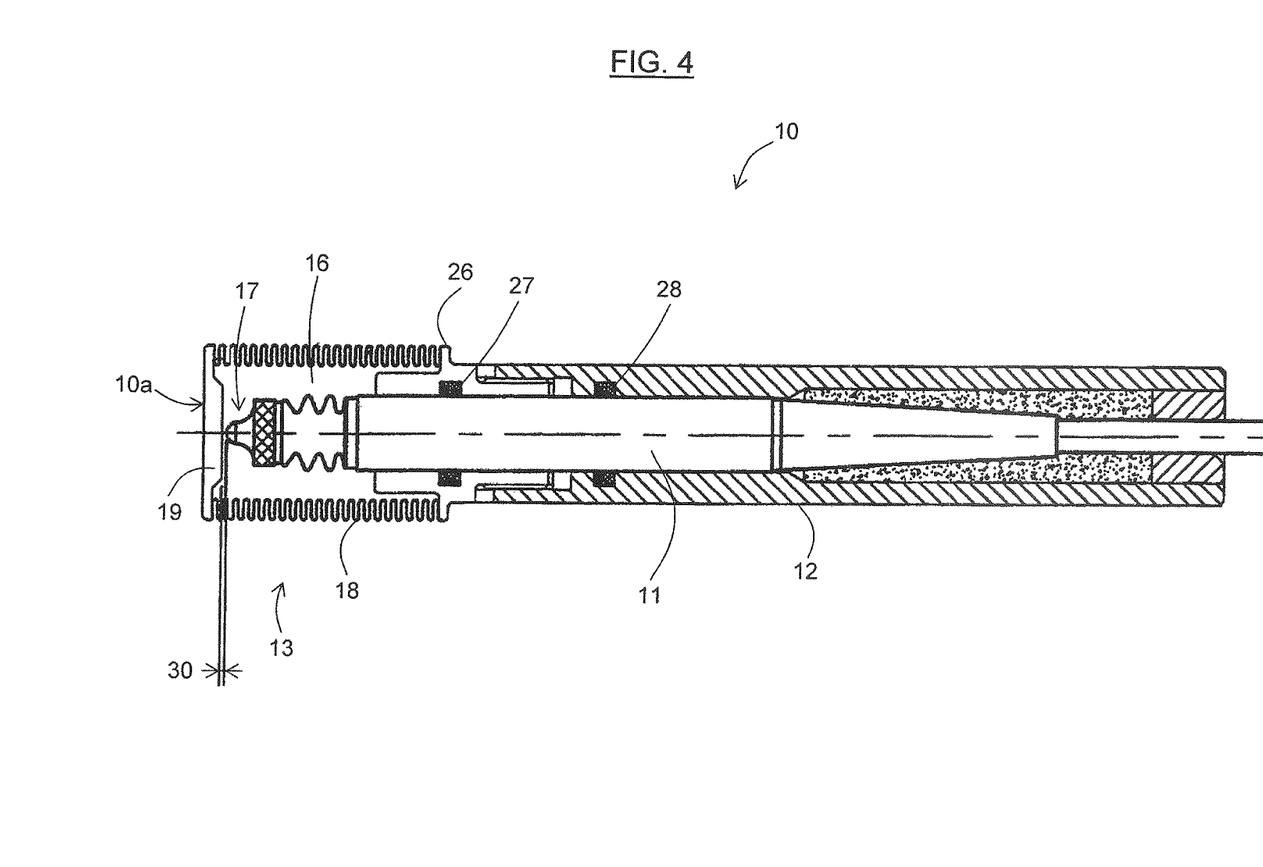
FIG. 4 is a diagrammatic longitudinal section view of the FIG. 3 measurement instrument, this figure showing the two portions of the body of the instrument assembled together.

The device 100 has two length measurement instruments 10 that are shown in detail in FIGS. 3 and 4.

The measurement instruments 10 are supported by a carriage 108. The carriage 108 and the instruments 10 can be moved vertically along the rod.

For this purpose, the carriage 108 is secured to a skid 109 that slides along a vertical guide 110, together with a nut 111 that co-operates with a screw 112 that also extends vertically.

Using a motor 114 to cause the screw 112 to rotate about its longitudinal axis 113 thus causes the support 108 and the instruments 10 to move along the rod 101.

A position sensor, such as a rotary coder secured to the screw 112, may be provided in order to deliver information about the vertical position of the carriage 108.

In order to examine a fuel rod, the rod is held stationary and the instruments 10 are caused to travel along the rod.

Figure 2:
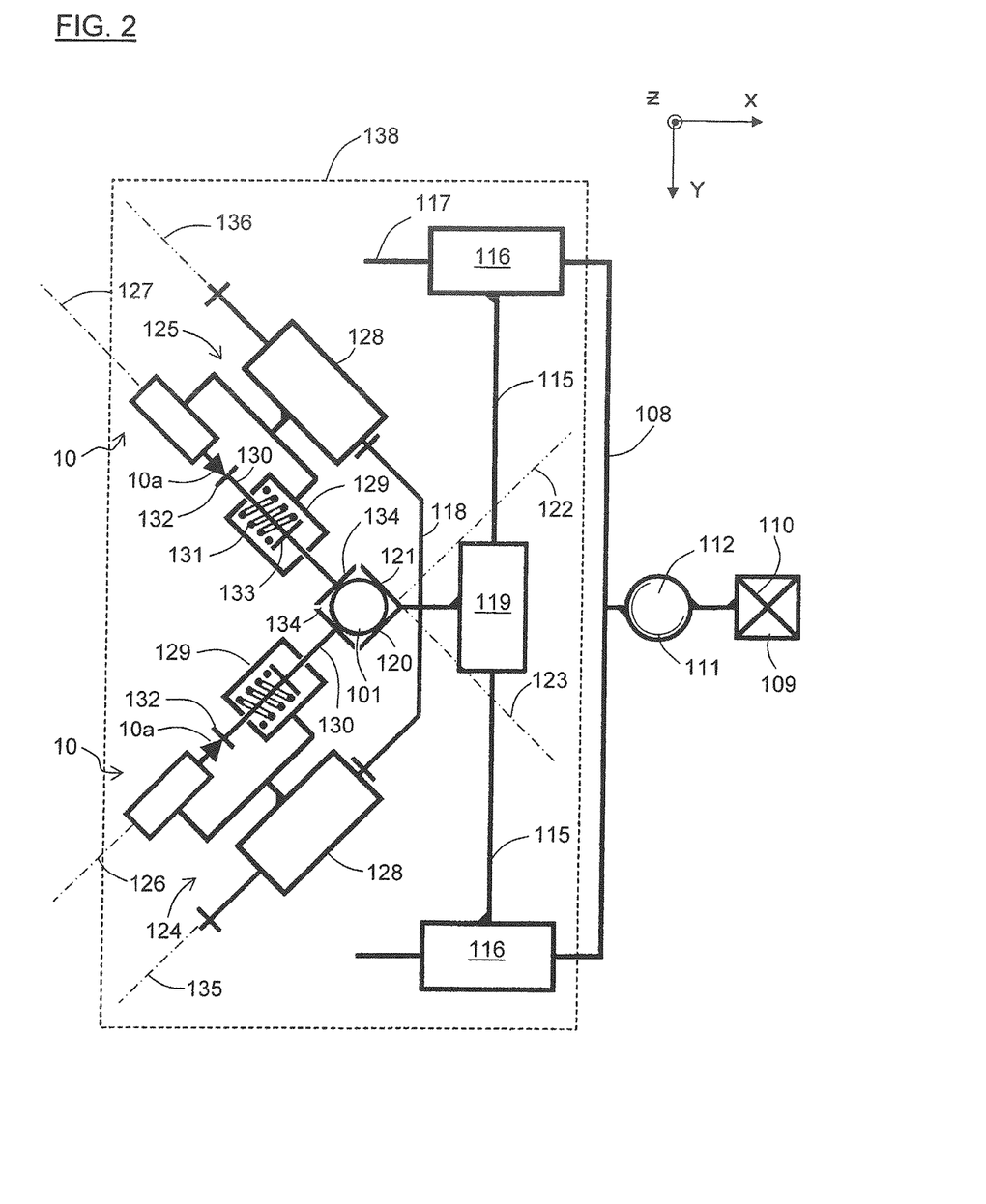
FIG. 2 is a diagrammatic view of a portion of the FIG. 1 device that comprises two instruments for measuring the "diameter" of a rod, respectively along two measurement axes that are mutually orthogonal and perpendicular to the longitudinal axis of the rod.

With reference to FIG. 2 in particular, the instruments 10 are secured to the instrument support 108 that is mounted to slide along the vertical axis Z, the instruments being secured by means of a plurality of supports:

a first support 115 that is fitted with two sliders 116 engaged respectively on two guides 117 parallel to the horizontal axis X so that the support 115 can slide freely along the axis X relative to the support 108; and a second support 118 that is fitted with a slider 119 engaged on a guide incorporated in the support 115 and parallel to a horizontal axis Y that is perpendicular to the axis X, such that the support 118 can slide freely along the axis Y relative to the support 115.

The supports 115, 118, and the associated sliders and guides thus form an X,Y cross motion table.

The support 118 carries two backstops 120, 121 that are arranged to be come into abutment against the outside face of the rod 101 for inspection, along two respective generator lines of that generally cylindrical outside face of circular section, these two generator lines being "spaced apart" angularly by about 90 degrees around the longitudinal axis of the rod.

Thus, the abutment faces of the two backstops 120, 121 extend tangentially to two orthogonal abutment planes that are parallel to the longitudinal axis of the rod and that have traces in the plane of FIG. 2 that are given respective references 122 and 123.

The ability of the two backstops 120, 121 to move freely in translation along the axes X and Y, as made possible by the mutual sliding of the supports 108, 115, and 118, makes it possible to cause the two backstops 120, 121 come into abutment against the outside surface of the rod 101 without generating a radial force on the rod.

The two length measurement instruments 10 are fastened to the support 118 via two respective supports 124, 125, and they extend respectively along two longitudinal axes 126, 127.

The axes 126, 127 are substantially orthogonal, being parallel respectively to the axes 122, 123, and they intersect at a point that coincides substantially with the trace of the longitudinal axis of the rod 101 in the plane of FIG. 2.

Each of the supports 124, 125 comprises a part 128, a housing 129, and a plunger 130 slidably mounted in the housing 129 to slide along the longitudinal axis 126, 127 of the instrument 10 under consideration.

Each housing 129 also contains a return spring 131. Each plunger 130 has three abutment faces 132, 133, and 134. Each helical spring 131 is in abutment against a wall of the corresponding housing 129 and against the central abutment face 133 of the plunger 130, such that each spring urges the plunger 130 towards the rod 101 and such that the end abutment face 134 of the plunger is kept in contact with the outside face of the sheath of the rod.

Thus, the measurement backstop 120 and the abutment face 134 (acting as a feeler) are pressed against two diametrically opposite generator lines of the rod by the action of the corresponding spring 131 acting along the longitudinal axis 127 of one of the two instruments 10.

In the same manner, the second measurement backstop 121 and the abutment face 134 (acting as a feeler) are pressed against the rod by the action of the corresponding spring 131 acting along the longitudinal axis 126 of the other instrument 10.

Furthermore, each instrument 10 is fastened to the corresponding support 124, 125 in such a manner that the feeler tip 10a of the instrument is in abutment against the second abutment face 132 at the end of the corresponding plunger 130.

A "diameter" (i.e. a greatest transverse dimension) of the rod can thus be measured along the axis 126 by measuring the spacing between the backstop 121 and the abutment face 134 of the plunger 130 that is movable along the axis 126 and that forms a measurement feeler, this measurement being obtained by the instrument 10 extending along the axis 126.

In the same manner, a second "diameter" of the rod may be measured along the axis 127 by measuring the spacing between the backstop 120 and the abutment face 134 of the plunger 130 that is movable along the axis 127, by means of the instrument 10 that extends along the axis 127.

Each of the supports 124, 125 of the instrument 1C including the corresponding movable plunger 130 and the associated measurement feeler 134 is mounted on the support 118 via respective slideways of axes 136, 137, which axes are parallel to the measurement axes 126 and 127, respectively.

This makes it possible to space the feelers 134 apart from the backstops 120, 121 so as to be able to insert or remove the fuel rod into or from the space that extends between these feelers and backstops.

The supports 124, 125 can be caused to move relative to the support 118 by a mechanical system (not shown) that is actuated by the operator.

The assembly 138 including the instruments 10 and their supports 124, 125, 118, and 115, also referred to as a "cassette", can be separated from the main support 108 in order to facilitate maintenance work on a bench, e.g. for the purpose of replacing the sensors 10, 11.

With reference to FIGS. 3 and 4, each instrument 10 comprises an LVDT sensor 11 mounted inside a structure that is airtight and watertight.

By way of example, the sensor 11 may be a precision sensor available from the supplier Solartron (United Kingdom) under the reference DP/2/S.

Such a sensor comprises an elongate cylindrical body 14 extending along the longitudinal axis 15 together with a feeler tip 17 that is movable in translation along the axis relative to the body 14.

The body 14 contains windings and it defines a first cavity that receives a magnetic core (not shown). The sensor also contains a mechanical connection connecting the feeler tip to the magnetic core, and generally a return spring for returning the feeler tip into its position furthest away from the body of the sensor. This connection is protected by an elastomer bellows 20 that extends between the feeler tip 17 and the body 14.

At the longitudinal end of the body 14 remote from the feeler tip 17, there extends a cable 21 for connecting the windings of the sensor 11 to a power supply and signal processor appliance (not shown) that outputs signals or data representative of the position of the feeler tip relative to the body of the sensor.

A portion of the body 14 is engaged, with a small amount of clearance, in a sleeve 12 that defines a cavity 22 in which the end of the cable 21 extends. An O-ring 28 provides sealing between the body 14 and the sleeve 12.

The cavity 22 is filled with a leaktight sealant such as a resin or a caulk; and a first end of the sleeve 12 is closed by a ring 23 through which the cable 21 extends.

The second end 12a of the sleeve 12 has an inside thread for receiving the threaded end 24 of a bushing 25 forming part of a casing 13.

The bushing 25 has an annular flange 26 having a first longitudinal end of a metal bellows 18 fastened thereto, the second longitudinal end of the bellows being closed by a part 19 that is substantially in the form of a disk of axis 15.

The bellows 18 has a longitudinal axis that corresponds to the axis of maximum elastic deformation of the bellows, and that coincides substantially with the axis 15 along which the feeler tip 17 slides relative to the body 14.

The casing 13 constituted by the bushing 25, the bellows 18, and the part 19 can thus be fastened to the body 14 of the sensor 11 by means of the sleeve 12, a gasket 27 providing sealing between the body 14 and the bushing 25 (cf. FIG. 4).

This casing 13 that extends the body 14 along the longitudinal axis 15 thus co-operates with the body to define a leaktight cavity 16 containing the feeler tip 17 and allowing the tip to move within the cavity 16.

The capacity for elastic deformation of the bellows of the casing along the longitudinal axis of the sensor is sufficient to enable the feeler tip 17 to sense movement of the abutment part 19 of the casing that lies in line with the feeler tip, under the effect of an abutment force exerted by an article to be measured against the outside face 10a of the part 19.

The outside face 10a of the part 19 thus serves as a feeler tip for the instrument 10.

In other words, the longitudinal stiffness of the bellows 18 is small enough to ensure that the part 19 can move along the longitudinal axis 15 of the bellows over all or part of the stroke of the feeler tip 17 and in contact therewith so that the relative movement between the body of the sensor and the part 19 that is placed in contact with an article to be measured is transmitted to the feeler tip 17 and to the magnetic core of the inductive sensor.

As shown in FIG. 4, the abutment part 19 of the casing 13 is located in line with the feeler tip 17 of the sensor and is spaced apart from the feeler tip by a distance 30 when the instrument 10 is at atmospheric pressure.

By selecting an appropriate diameter and an appropriate axial stiffness for the bellows, the inside face 31 of the part 19 comes into contact with the feeler tip of the inductive sensor when the instrument 10 is placed in the pool at immersion depths lying in the range defined by the ends of the rod for inspection.

Figure 5:
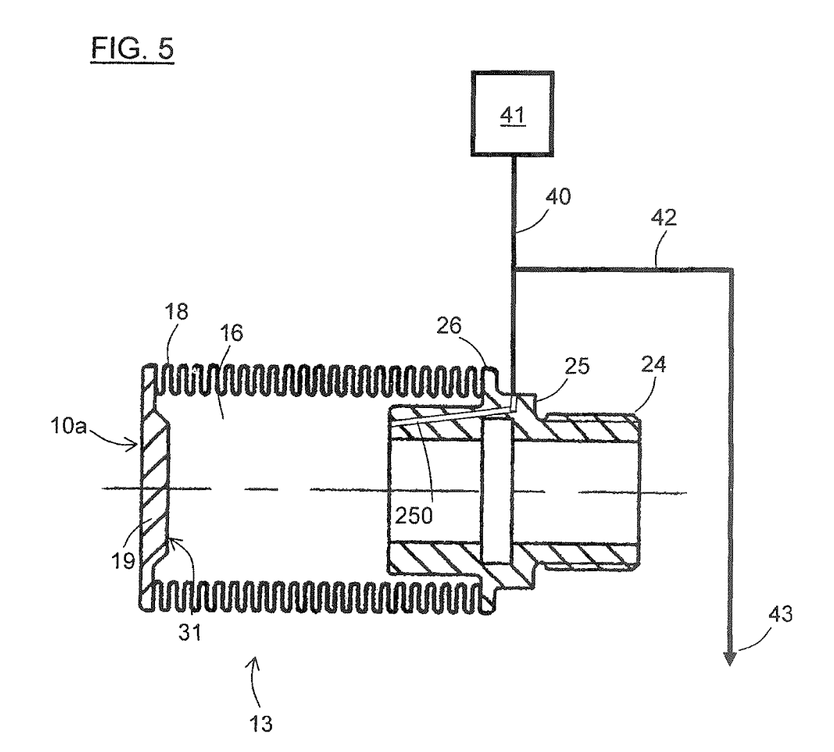
FIG. 5 is a diagrammatic longitudinal section view of a variant embodiment of the bellows casing of the measurement instrument of FIGS. 3 and 4, and it shows diagrammatically how the casing is used for an instrument taking measurements over a large range of immersion depths of the instrument.

FIG. 5 shows an embodiment of the casing 13 and its use for measuring rods that are longer (e.g. five meters) with the help of a system for compensating the pressure inside the bellows casing of the measurement instrument.

For this purpose, the body of the bushing 25 is pierced by a channel 250 having a first end leading into the cavity 16 and a second end that is in communication with a duct 40 connecting the casing 13 to a source 41 of gas under pressure.

A branch duct 42 connected to the duct 40 at its first end opens out via its second end 43 into the pool at an immersion depth that is preferably a little greater than the immersion depth of the casing 13.

The source 41 delivers gas under pressure into the cavity 16 and also to the end 43 of the duct 42 (from which gas can escape into the pool) and it serves to maintain a pressure inside the cavity 16 that is substantially equal to the corresponding pressure at the depth of immersion of the end 43.

In an embodiment, a method of inspecting the dimensions of a fuel rod comprises the following successive operations:

positioning the carriage 108 and the cassette 138 in a low position and moving the feelers 130, 132, 134 away from the backstops 120, 121;

using a transfer clamp (not shown) to move the rod under water in order to place it on the profile-measurement bench, and placing the rod in abutment against the bottom support 104;

putting the tailstock 106 into place in abutment on the rod and holding the rod 101 for inspection in a substantially vertical position under the level 103 of the water in a pool;

selecting and adjusting the angular position of the rod with the help of a camera immersed in the pool;

possibly taking a photograph of the angular position of the rod in order to be able to reposition the rod in the same angular position during subsequent measurements;

where appropriate, and in order to calibrate the two LVDT sensors at the ambient temperature of the water, moving the two backstops 120, 121 and the two movable measurement feelers 130, 132, 134 so that they abut respectively against two respective feeler tips 10a of the two instruments 10 so as to put them into contact with the outside surface of the calibration stud that is incorporated in the tailstock 106, and then measuring the two greatest transverse dimensions of the stud with the help of the two instruments 10, and then moving the feelers 134 away from the stud;

moving the two backstops 120, 121 and the two movable measurement feelers 130, 132, 134 against which the respective feeler tips 10a of the two respective instruments 10 are in abutment until they come into contact with the outside surface of the rod;

measuring the two greatest transverse dimensions of the rod with the help of the two instruments 10; and moving the support 108 to which the backstops 120, 121, the movable measurement feelers 130, 132, 134, and the instruments 10 are fastened along the rod so as to take new measurements of the two greatest transverse dimensions of the rod with the help of the two instruments 10.

The two "diameters" may be measured continuously. The sensor-carrier cassette may be moved vertically for this purpose at a constant speed, with measurements being taken at a steady rate, e.g. by taking a measurement at regular steps of 0.1 millimeters (mm) as measured along the longitudinal axis of the rod.

A recording of the measurements may then be used to plot two respective variation profiles for two "diameters" of the rod, these profiles being measured respectively along two radii that are an angle of 90° each other.

After the "diameters" of the rod have been measured in this way, it is possible to "open" the cassette by moving the feelers 134 away from the backstops 120, 121; the tailstock 106 can then be raised, the grip on the rod relaxed, and then the rod can be removed from the bench using the transfer clamp.

By keeping the cassette stationary and causing the rod to rotate about its own axis, the bench also makes it possible to measure a radial profile, i.e. to measure ovalization.

The invention claimed is:

1. A length measurement instrument (10) comprising an inductive sensor (11) comprising an elongate body (14) having a longitudinal axis and a feeler tip (17) movable along the longitudinal axis (15) of the sensor, in which the body (14) contains windings and defines a first cavity receiving a magnetic core, the instrument further comprising a casing (13) extending the body (14) along the longitudinal axis (15) and co-operating with the body (14) to define a second cavity (16) that is leaktight and that contains the feeler tip (17), the casing comprising a watertight deformable part (18) surrounding the feeler tip (17) and an abutment portion (19) extending in line with the feeler tip (17) and wherein the capacity of the casing for elastic deformation along the longitudinal axis (15) is greater than the capacity of the casing for elastic deformation along axes orthogonal to the longitudinal axis; and the capacity of the casing for elastic deformation along the longitudinal axis is sufficient for the feeler tip (17) to be sensitive to movement of the abutment portion (19) under the effect of an abutment force exerted on the abutment portion (19).

2. An instrument according to claim 1, wherein the abutment portion (19) is spaced apart from the feeler tip (17) of the inductive sensor when the instrument is at atmospheric pressure, with said abutment portion (19) coming into contact with the feeler tip (17) when the instrument is placed in a medium in which pressure is greater than atmospheric pressure.

3. An instrument according to claim 1, wherein the watertight deformable part (18) presents axial stiffness along the longitudinal axis (15) and radial stiffness greater than its axial stiffness, such that the axis of greatest elastic deformation of the part (18) coincides substantially with the sliding axis (15) of the feeler tip.

4. An instrument according to claim 1, wherein the watertight deformable part (18) is in the form of a body of revolution.

5. An instrument according to claim 1, wherein the ratio of the radial stiffness of the leaktight deformable casing (13) to its axial stiffness is greater than 10.

6. An instrument according to claim 5, wherein the ratio of the radial stiffness of the leaktight deformable casing to its axial stiffness is greater than 100 or greater than 1000.

7. An instrument (10) according to claim 1, comprising an inductive sensor (11) of the LVDT type, wherein:

the casing includes a bellows (18) presenting a longitudinal axis (15) that corresponds to the axis of greatest elastic deformation of the bellows, and that coincides substantially with the sliding axis of the feeler tip;

the bellows (18) is fastened in leaktight manner to the body of the sensor at a first one of its longitudinal ends;

the casing includes a pad (19) closing the bellows at its second longitudinal end; and the longitudinal stiffness of the bellows is small enough to enable the pad (19) to move along the common longitudinal axis (15) of the bellows (18) and of the sensor (11) over at least a substantial fraction of the stroke of the feeler tip (17) and in contact therewith, whereby movement of the pad (19) placed in contact with an article for measuring and moving relative to the body of the sensor is transmitted to the feeler tip (17) and to a magnetic core of the inductive sensor, the outside face (10a) of the pad (19) serving as a feeler tip for the instrument.

8. An instrument according to claim 1, wherein at least a portion of the deformable casing (13), is made of metal.

9. An instrument according to claim 1 wherein the watertight deformable part (18) is in the form of a corrugated tube, and is constituted essentially by a bellows.

10. An instrument according to claim 9, wherein the bellows (18) and the abutment portion or pad (19) are made of metal.

11. A device (100) for inspecting the shape of the outside face of a fuel rod (101), the device including at least one length measurement instrument (10) comprising an inductive sensor (11) comprising an elongate body (14) having a longitudinal axis and a feeler tip (17) movable along the longitudinal axis (15) of the sensor, in which the body (14) contains windings and defines a first cavity receiving a magnetic core, the instrument further comprising a casing (13) extending the body (14) along the longitudinal axis (15) and co-operating with the body (14) to define a second cavity (16) that is leaktight and that contains the feeler tip (17), the casing comprising a watertight deformable part (18) surrounding the feeler tip (17) and an abutment portion (19) extending in line with the feeler tip (17) and wherein the capacity of the casing for elastic deformation along the longitudinal axis (15) is greater than the capacity of the casing for elastic deformation along axes orthogonal to the longitudinal axis; and the capacity of the casing for elastic deformation along the longitudinal axis is sufficient for the feeler tip (17) to be sensitive to movement of the abutment portion (19) under the effect of an abutment force exerted on the abutment portion (19).

12. A device according to claim 11 comprising a stationary structure (110) and an instrument support (108, 115, 118, 124, 125) that is movable in translation relative to the stationary structure along a first axis (Z, 113) and along at least one second axis (X, Y) perpendicular to the first axis.

13. A device according to claim 12, wherein the instrument support comprises an X,Y cross motion table (108, 115, 118) carrying backstops (120, 121) and allowing the backstops (120, 121) to move relative to a rod (101) for inspection at least along the second axis (X,Y).

14. A device according to claim 12, wherein the instrument support receives i) a first length measurement instrument in which the axis (15, 126) of least stiffness of the deformable casing is substantially orthogonal to the axis (Z, 113) in which the instrument support moves in translation; and ii) a second length measurement instrument, substantially identical to the first length measurement instrument, in which the axis (15, 127) of least stiffness of the deformable casing is substantially orthogonal to the axis (Z, 113) in which the instrument support moves in translation and also, where appropriate, to the axis (15, 126) of preferred deformation of the first length measurement instrument.

15. A device according to claim 14, wherein an instrument support includes two parts (120, 121) acting as backstops for a rod (101) for inspection, two movable parts (130, 132, 134) acting as measurement feelers and against which the abutment portions (10a, 19) of the respective casings of the two length measurement instruments (10) come into abutment, and return means (133) for keeping the outside surface of a rod for inspection in contact with the measurement feelers and with the backstops.

16. A device according to claim 14, including a calibration stud essentially consisting in a cylindrical part of circular section that is arranged to extend the top end of a rod for inspection and that is of diameter that corresponds to the nominal value of the diameter of the rod in order to enable the length measurement instruments to be calibrated by measuring the diameter(s) of the stud.

17. A method of inspecting the shape of the outside face of a fuel rod (101) in which use is made of device according to claim 12 and wherein the following steps are performed
holding a rod (101) for inspection in a substantially vertical position under the level (103) of water in a pool;
selecting the angular position of the rod;
causing two backstops (120, 121) and two movable measurement feelers (130, 132, 134) having two respective feeler tips (10a) of two respective instruments (10) in abutment thereagainst to be put into place against the outside surface of the rod;
measuring two greatest transverse dimensions of the rod with the help of the two instruments (10); and
causing a support (108) to which the backstops (120, 121), the movable measurement feelers (130, 132, 134), and the instruments (10) are fastened to move relative to the rod and taking new measurements of two greatest transverse dimensions of the rod with the help of the two instruments (10).

18. A method according to claim 17, wherein the support (108) is moved along the rod in order to establish a profile of the variations in the greatest transverse dimensions of the rod along the longitudinal axis of the rod.

19. A method according to claim 18, wherein the rod is caused to turn about its longitudinal axis in order to take a measurement of the ovalization of the rod.

20. A method according to claim 18, wherein the immersion pressure of the casing (13) of the measurement instrument is compensated by delivering gas under pressure into the second cavity (16) and to the immersed end (43) of a duct (42) from which the gas can escape.

21. A method according to claim 18, wherein, in order to calibrate the two inductive sensors at the ambient temperature in the water, two backstops (120, 121) and two movable measurement feelers (130, 132, 134) having two respective feeler tips (10a) of two respective instruments (10) in abutment thereagainst are caused to move until they come into contact with the outside surface of a calibration stud, and two greatest transverse dimensions of the stud are measured with the help of the two instruments (10).

* * * * *